(12) United States Patent
Chowdhury et al.

(10) Patent No.: US 11,940,819 B1
(45) Date of Patent: Mar. 26, 2024

(54) MASS FLOW CONTROLLER BASED FAST GAS EXCHANGE

(71) Applicant: Applied Materials, Inc., Santa Clara, CA (US)

(72) Inventors: Abhishek Chowdhury, Bangalore (IN); Ravikumar Patil, Bengaluru (IN); Arun Chakravarthy Chakravarthy, Tamil Nadu (IN); Jon Christian Farr, Tempe, AZ (US); Saravanan Chandrabalu, Bangalore (IN); Prabhuraj Kuberan, Bangalore (IN)

(73) Assignee: APPLIED MATERIALS, INC., Santa Clara, CA (US)

( * ) Notice: Subject to any disclaimer, the term of this patent is extended or adjusted under 35 U.S.C. 154(b) by 0 days.

(21) Appl. No.: 18/099,853

(22) Filed: Jan. 20, 2023

(51) Int. Cl.
*G05D 11/13* (2006.01)
*B01F 23/10* (2022.01)
*F17D 1/04* (2006.01)
*F17D 3/01* (2006.01)

(52) U.S. Cl.
CPC .......... *G05D 11/132* (2013.01); *B01F 23/191* (2022.01); *F17D 1/04* (2013.01); *F17D 3/01* (2013.01); *Y10T 137/87249* (2015.04)

(58) Field of Classification Search
CPC .......... Y10T 137/87249; B01F 23/191; G05D 11/132; F17D 1/04; F17D 3/01
USPC ........................................................ 137/597
See application file for complete search history.

(56) References Cited

U.S. PATENT DOCUMENTS

| | | | | |
|---|---|---|---|---|
| 5,496,408 A | * | 3/1996 | Motoda | H01L 21/0262 257/E21.101 |
| 5,662,143 A | * | 9/1997 | Caughran | C23C 16/54 137/884 |
| 5,958,140 A | * | 9/1999 | Arami | C30B 25/10 156/345.52 |
| 6,287,980 B1 | * | 9/2001 | Hanazaki | H01L 21/67069 438/726 |
| 6,333,272 B1 | * | 12/2001 | McMillin | H01L 21/67069 438/935 |
| 6,752,166 B2 | * | 6/2004 | Lull | G05D 7/0664 137/9 |
| 7,481,902 B2 | * | 1/2009 | Shinriki | H01L 21/0228 251/248 |
| 7,674,393 B2 | * | 3/2010 | Tahara | H01J 37/32935 257/E21.252 |

(Continued)

*Primary Examiner* — William M McCalister
(74) *Attorney, Agent, or Firm* — MOSER TABOA (57) ABSTRACT

Embodiments of fast gas exchange (FGE) manifolds are provided herein. In some embodiments, a FGE manifold includes: a manifold housing having a plurality of inlets and a plurality of outlets for flowing a plurality of process gases therethrough, wherein the plurality of outlets correspond with a plurality of zones in the process chamber; a plurality of hybrid valves disposed in the manifold housing and fluidly coupled to the plurality of inlets; a plurality of mass flow controllers disposed in the manifold housing downstream of the plurality of hybrid valves; a plurality of mixing lines extending downstream from the plurality of mass flow controllers to a plurality of outlet lines; and a plurality of outlet valves disposed in line with corresponding ones of the plurality of outlet lines, wherein a flow path is defined between each inlet of the plurality of inlets and each outlet of the plurality of outlets.

20 Claims, 6 Drawing Sheets

(56) References Cited

U.S. PATENT DOCUMENTS

| | | | | |
|---|---|---|---|---|
| 7,674,394 | B2* | 3/2010 | Paterson | H01J 37/321 438/689 |
| 7,846,497 | B2* | 12/2010 | Gold | H01L 21/67098 427/248.1 |
| 8,074,677 | B2* | 12/2011 | Gold | H01J 37/3244 702/45 |
| 8,235,001 | B2* | 8/2012 | Sano | C23C 16/4408 118/695 |
| 8,397,668 | B2* | 3/2013 | Kobayashi | H01J 37/32082 156/345.43 |
| 8,539,908 | B2* | 9/2013 | Takagi | H01L 21/3141 118/698 |
| 9,305,810 | B2* | 4/2016 | Singh | H01L 21/6719 |
| 9,488,315 | B2* | 11/2016 | Nangoy | H01J 37/32449 |
| 10,934,621 | B2* | 3/2021 | Sung | C23C 16/45561 |
| 11,610,759 | B2* | 3/2023 | Rogers | C23C 16/52 |
| 2002/0042205 | A1* | 4/2002 | McMillin | H01L 21/67017 438/710 |
| 2002/0152797 | A1* | 10/2002 | McAndrew | G01N 21/39 73/23.2 |
| 2002/0192369 | A1* | 12/2002 | Morimoto | C23C 16/52 118/712 |
| 2003/0192608 | A1* | 10/2003 | Otsuki | F17D 1/04 137/884 |
| 2005/0199342 | A1* | 9/2005 | Shajii | C23C 16/45561 137/9 |
| 2006/0027274 | A1* | 2/2006 | Funes | F17D 1/04 137/884 |
| 2006/0124169 | A1* | 6/2006 | Mizusawa | H01L 21/67253 137/7 |
| 2007/0181181 | A1* | 8/2007 | Mizusawa | H01J 37/3244 438/5 |
| 2009/0117746 | A1* | 5/2009 | Masuda | H01L 21/67069 118/723 R |
| 2009/0272717 | A1* | 11/2009 | Pamarthy | H01L 21/30655 216/37 |
| 2010/0155971 | A1* | 6/2010 | Uchida | F17D 1/04 261/130 |
| 2012/0227817 | A1* | 9/2012 | Cruse | B01F 23/191 137/557 |
| 2021/0088367 | A1* | 3/2021 | Kutney | G01F 1/74 |
| 2022/0262600 | A1* | 8/2022 | Xu | H01J 37/32449 |
| 2023/0017206 | A1* | 1/2023 | Brashear | H01L 21/67017 |

* cited by examiner

MASS FLOW CONTROLLER BASED FAST GAS EXCHANGE

FIELD

Embodiments of the present disclosure generally relate to substrate processing equipment.

BACKGROUND

The fabrication of microelectronic devices includes a number of different stages, each including a variety of processes. During one stage, a particular process may include imparting a plasma to the surface of a substrate, such as a silicon substrate, to alter the physical and material properties of the substrate. Such a process may be known as etching, which may involve the removal of materials to form holes, vias, and/or other openings (referred to herein as "trenches") in the substrate. A deposition process involves depositing materials onto the substrate. For certain processes with a deep trench etch application, deposition and etch steps may be alternated in a repetitive manner to achieve high aspect ratio etch. The deposition and etch steps use different chemistry with short interval of process switch time (about 0.5 sec). A fast gas exchange (FGE) concept may be employed on the substrate process equipment to switch deposition and etch process chemistry in a short interval of time. FGE is located on the front of the chamber of the processing equipment to reduce the dead volume so that system can have better response.

Conventional FGEs use mass flow controllers in a gas panel for flow control and an on/off valve to control gas flow in desired regions of the chamber. Such conventional FGEs are capable of handling two gases that are always kept flowing on the gas panel side and the on/off valves control the flow of each gas to either chamber center or middle regions, or to a dump (foreline). Such FGEs are limited to handling two gases and produce a lot of gas wastage due to the gases being constantly flowing and dumping. Accordingly, the inventors have provided herein embodiments of improved FGEs.

SUMMARY

Embodiments of fast gas exchange (FGE) manifolds are provided herein. In some embodiments, a FGE manifold for a process chamber includes: a manifold housing having a plurality of inlets and a plurality of outlets for flowing a plurality of process gases therethrough, wherein the plurality of outlets correspond with a plurality of zones in the process chamber; a plurality of hybrid valves disposed in the manifold housing and fluidly coupled to the plurality of inlets; a plurality of mass flow controllers disposed in the manifold housing downstream of the plurality of hybrid valves, wherein each of the plurality of hybrid valves is associated with one or two of the mass flow controllers, and wherein each mass flow controller is associated with one of the plurality of zones; a plurality of mixing lines extending downstream from the plurality of mass flow controllers to a plurality of outlet lines corresponding with the plurality of outlets, wherein the plurality of mixing lines associated with each of the plurality of zones are fluidly coupled to a corresponding one of the plurality of outlets; and a plurality of outlet valves disposed in line with corresponding ones of the plurality of outlet lines, wherein a flow path is defined between each inlet of the plurality of inlets and each outlet of the plurality of outlets, and wherein each flow path includes one or more of the plurality of hybrid valves and one or more of the plurality of mass flow controllers.

In some embodiments, a fast gas exchange system for a process chamber includes: a fast gas exchange manifold, comprising: a manifold housing having a plurality of inlets and a plurality of outlets for flowing a plurality of process gases therethrough; a plurality of mass flow controllers coupled to the manifold housing and configured to flow corresponding ones of the plurality of process gases to a plurality of zones of the process chamber, wherein the mass flow controllers are disposed between the plurality of inlets and the plurality of outlets; a plurality of hybrid valves coupled to the manifold housing and disposed upstream from the plurality of mass flow controllers; and a plurality of mixing lines extending downstream from the plurality of mass flow controllers to a plurality of outlet lines corresponding with the plurality of outlets; and a gas panel having a plurality of gas sources for supplying the plurality of process gases; and gas supply lines extending from the plurality of gas sources to the fast gas exchange manifold, wherein each of the gas supply lines include a control valve.

In some embodiments, a substrate processing apparatus includes: a process chamber having an interior volume disposed therein, wherein the process chamber includes a plurality of zones; a fast gas exchange manifold a gas manifold, comprising: a manifold housing having a plurality of inlets and a plurality of outlets for flowing a plurality of process gases therethrough, wherein the plurality of outlets correspond with the plurality of zones; a plurality of hybrid valves disposed in the manifold housing and fluidly coupled to the plurality of inlets; a plurality of mass flow controllers disposed in the manifold housing downstream of the plurality of hybrid valves, wherein each of the plurality of hybrid valves is associated with one or two of the mass flow controllers, and wherein each mass flow controller is associated with one of the plurality of zones; a plurality of mixing lines extending downstream from the plurality of mass flow controllers to a plurality of outlet lines corresponding with the plurality of outlets, wherein the plurality of mixing lines associated with each of the plurality of zones are fluidly coupled to a corresponding one of the plurality of outlets; and a plurality of outlet valves disposed in line with corresponding ones of the plurality of outlet lines, wherein a flow path is defined between each inlet of the plurality of inlets and each outlet of the plurality of outlets, and wherein each flow path includes one or more of the plurality of hybrid valves and one or more of the plurality of mass flow controllers.

Other and further embodiments of the present disclosure are described below.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. However, the appended drawings illustrate only typical embodiments of the disclosure and are therefore not to be considered limiting of scope, for the disclosure may admit to other equally effective embodiments.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION

Embodiments of fast gas exchange (FGE) systems are provided herein. The inventive FGE systems comprise a FGE manifold that includes a plurality of mass flow controllers (MFCs) having a rapid response. In some embodiments, the rapid response corresponds with a rate of about 0.1 to about 1 sec. The MFCs may be dedicated for a respective process gas or the MFCs may be shared for multiple process gases. The FGE manifold is advantageously disposed proximate to or coupled to a process chamber for reduced gas travel distance and hence more rapid switching. The inventive FGE system may be modular so that two or more gases advantageously may be provided to a process chamber. The FGE system advantageously eliminates gas wastage due to dumping of process gases into the foreline.

Figure 1:
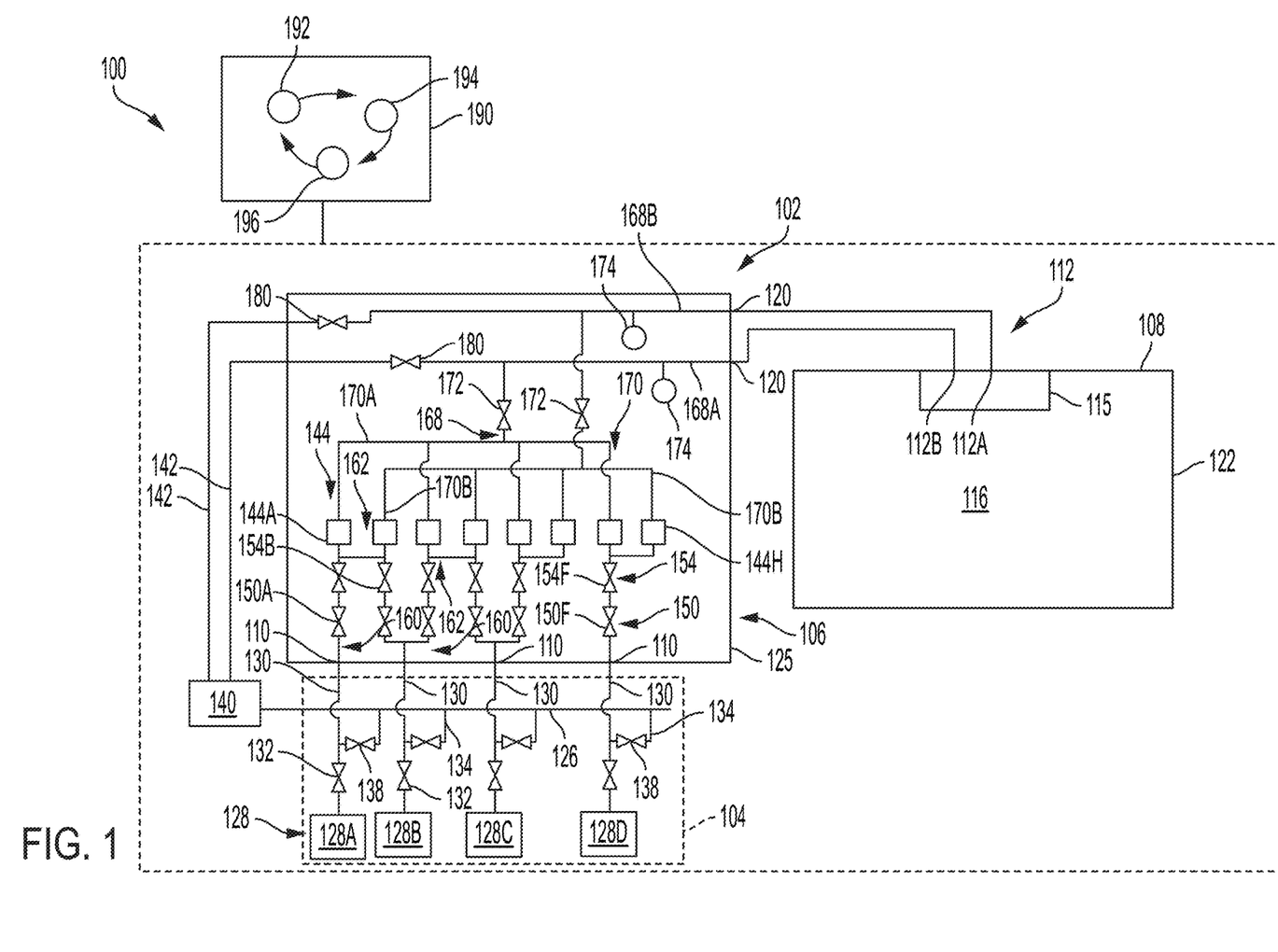
FIG. 1 depicts a schematic view of a fast gas exchange system for a process chamber in accordance with at least some embodiments of the present disclosure.
Figure 7:
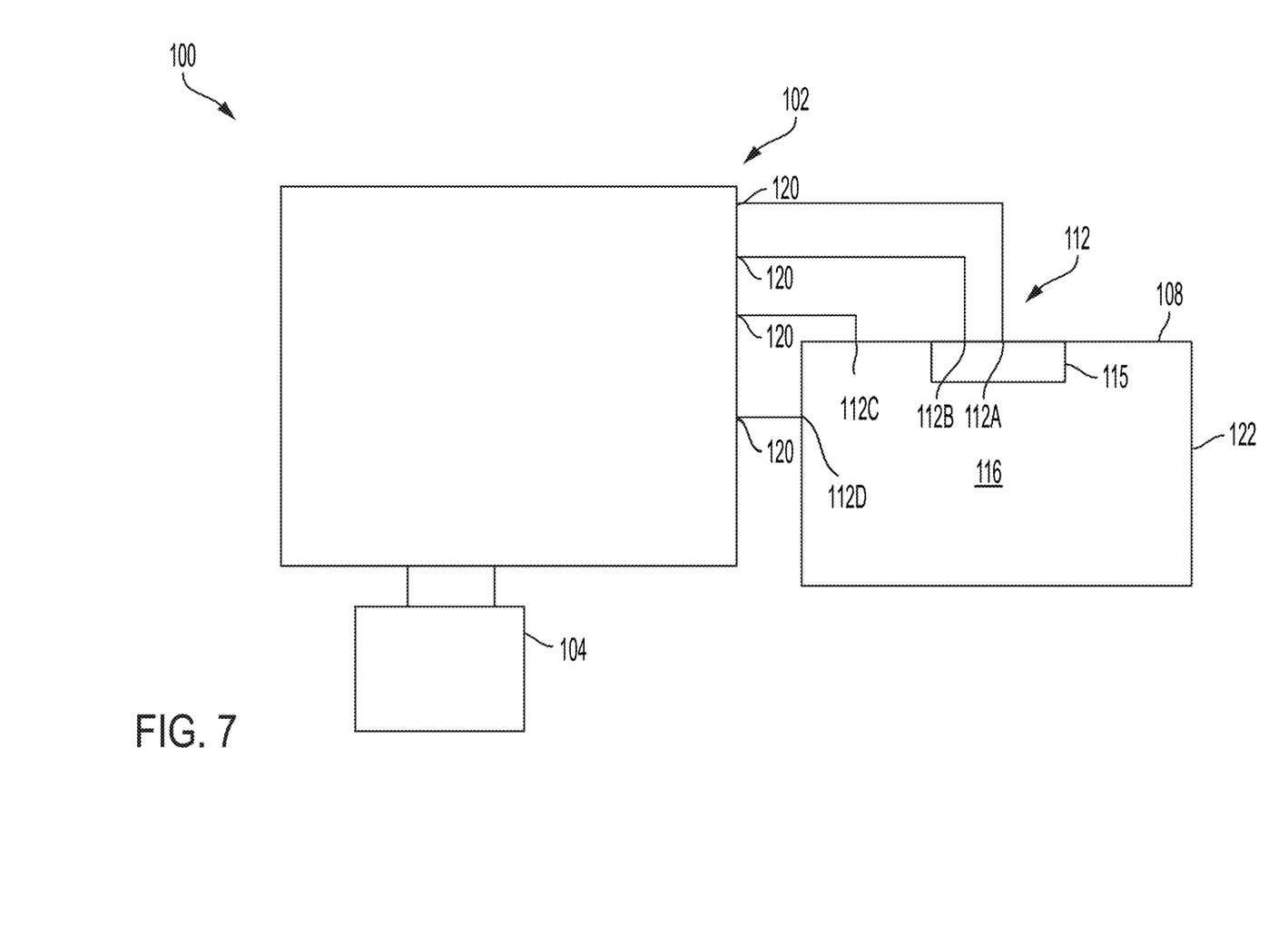
FIG. 7 depicts a schematic view of a fast gas exchange system with a process chamber having a plurality of zones in accordance with at least some embodiments of the present disclosure.

FIG. 1 depicts a schematic view of a fast gas exchange (FGE) system 100 for a process chamber in accordance with at least some embodiments of the present disclosure. The FGE system 100 generally includes a gas panel 104 coupled to a FGE manifold 102 for providing process gases to a process chamber 108. The process chamber 108 may be any process chamber suitable for performing etch or deposition processes on a substrate. The process chamber 108 has a chamber body 122 that defines an interior volume 116 therein. The process chamber 108 includes a plurality of zones 112 for gas delivery. In some embodiments, as illustrated in FIG. 1, the plurality of zones 112 comprise a center zone 112A and an outer zone 112B. In some embodiments, the process chamber 108 includes a showerhead 115 for delivering the process gases into the interior volume 116. In some embodiments, the showerhead 115 defines the plurality of zones. In some embodiments, the process chamber 108 may include more than two zones, for example, as depicted in FIG. 7, the center zone 112A, the outer zone 112B, and an edge zone 112C. In some embodiments, the more than two zones may include a side zone 112D.

The gas panel 104 generally includes a plurality of gas sources 128 for supplying the plurality of process gases and includes the associated flow control valves and lines. In some embodiments, the plurality of gas sources 128 comprise three or more gas sources, for example, four gas sources 128A-D containing, for example, gas A, gas B, gas C, and gas D, respectively. Gases A-D may be any combination of compatible gases. For example, in some embodiments, the first gas source 128A includes a suitable etchant gas. In some embodiments, the second gas source 128B includes a suitable deposition gas, such as a fluorocarbon. In some embodiments, the third gas source 128C includes a suitable reactant gas. In some embodiments, the fourth gas source 128D includes a suitable inert gas.

The associated flow control valves and lines of the gas panel 104 include gas supply lines 130 extending from the plurality of gas sources 128 to the FGE manifold 106. Each of the gas supply lines 130 may include a control valve 132 comprising an on/off valve for controlling the flow of the plurality of gas sources 128 to the FGE manifold 106. The gas panel 104 may further include a bypass line 126 coupled to each of the gas supply lines 130 via lines 134. A second control valve 138 is disposed along each of the lines 134 for starting or stopping flow of each respective process gas through the bypass line 126. In some embodiments, the gas panel 104 does not include any mass flow controllers.

The bypass line 126 is configured for delivering any of the process gases from the plurality of gas sources 128 to the process chamber 108 when fast switching of any of the process gases is not required for certain applications. In some embodiments, the bypass line 126 is coupled to a flow ratio controller 140 that splits flow from the bypass line 126 into a plurality of delivery lines 142 corresponding with the plurality of zones 112 in a desired ratio. The flow ratio controller 140 and the plurality of delivery lines 142 are disposed outside of the FGE manifold 106 and thus are inadequate at providing fast gas switching.

The FGE manifold 106 generally includes a manifold housing 125 having a plurality of inlets 110 and a plurality of outlets 120 for flowing the plurality of process gases from the gas panel 104 therethrough. The plurality of outlets 120 correspond with the plurality of zones 112 in the process chamber 108. For example, FIG. 1 depicts the process chamber 108 having two zones and the manifold housing 125 having two outlets. The plurality of inlets 110 are fluidly coupled to a plurality of mass flow controllers (MFCs) 144, which are in turn, fluidly coupled to respective ones of the plurality of outlets 120. The plurality of MFCs 144 are coupled to the manifold housing 125 and configured to flow corresponding ones of the plurality of process gases to the plurality of zones 112 of the process chamber 108.

In some embodiments, the FGE manifold 102 includes a plurality of hybrid valves 150 disposed in or coupled to the manifold housing 125 between the plurality of MFCs 144 and the plurality of inlets 110. In some embodiments, the plurality of hybrid valves 150 comprise a pneumatic on/off valve or a manual on/off valve. The plurality of hybrid valves 150 (e.g., hybrid valves 150A-150F) may be provided upstream of the plurality of MFCs 144 for servicing and backup. The plurality of hybrid valves 150 are fluidly coupled to the plurality of inlets 110 via a plurality of first inlet lines 160. The plurality of hybrid valves 150 are fluidly coupled to the plurality of MFCs 144 via a plurality of second inlet lines 162. In some embodiments, each of the plurality of hybrid valves 150 is associated with one or two of the MFCs 144. For example, in some embodiments, second inlet lines 162 extend from each of the plurality of hybrid valves 150 to two of the MFCs of the plurality of MFCs 144. The plurality of hybrid valves 150 may be normally open and closed when servicing, for example. In some embodiments, each of the plurality of hybrid valves 150 is associated with only one or two of the MFCs 144.

The plurality of MFCs 144 are disposed downstream of the plurality of hybrid valves 150 and each MFC is associated with one of the plurality of zones 112. In some embodiments, each of the plurality of MFCs 144 is configured to flow a single one of the plurality of process gases (discussed in more detail with respect to FIGS. 2A and 2B below). In some embodiments, at least some of the plurality of MFCs 144 are configured to flow multiples ones of the plurality of process gases therethrough (discussed in more detail with respect to FIG. 3 below). In some embodiments, each MFC is associated with only one of the plurality of zones 112. In some embodiments, the plurality of MFCs 144 have a response rate of about 0.1 to about 1 seconds. In some embodiments, the plurality of MFCs 144 have a response rate of about 0.1 to about 0.4 seconds. In some embodiments, as depicted in FIG. 1, the plurality of zones 112 consist of two zones and the plurality of MFCs 144 consist of eight MFCs (e.g., MFCs 144A-144H).

In some embodiments, an ALD valve 154 comprising a pneumatic on/off valve may be provided upstream of the plurality of MFCs 144 for backup for the plurality of MFCs, gas switching, and/or flow directional control as described herein. The plurality of ALD valves 154 (e.g., ALD valves 154A-154F) are generally fast switching valves with a response time of less than about 200 milli seconds, for example, less than 50 milliseconds or less than 20 milliseconds. In some embodiments, the plurality of ALD valves 154 are disposed in the manifold housing 125 and disposed downstream of the plurality of hybrid valves 150 between the plurality of hybrid valves 150 and the plurality of MFCs 144. In other embodiments, the plurality of hybrid valves 150 may be disposed between the plurality of ALD valves 154 and the plurality of MFCs 144.

A plurality of mixing lines 170 are disposed in the FGE manifold 106 and extend downstream from the plurality of MFCs 144 to a plurality of outlet lines 168 corresponding with the plurality of outlets 120. For example, first mixing lines 170A may converge to a first outlet line 168A that is coupled to a first outlet of the plurality of outlets 120 that extends to the outer zone 112B. Second mixing lines 170B may converge to a second outlet line 168B that is coupled to a second outlet of the plurality of outlets 120 that extends to the center zone 112A.

In some embodiments, a plurality of outlet valves 172 are disposed in line with corresponding ones of the plurality of outlet lines 168. In some embodiments, the plurality of outlet valves 172 are normally closed. The plurality of outlet valves 172 may be fast switching valves with response times of less than about 500 milliseconds. In some embodiments, each of the plurality of outlet lines 168 include a pressure sensor 174 for measuring a line pressure to determine fluid flow and flow rates of fluids passing therethrough.

In some embodiments, the plurality of delivery lines 142 may be coupled to corresponding ones of the plurality of outlet lines 168 for flowing process gases from the bypass line 126. In some embodiments, bypass valves 180 are disposed along the plurality of delivery lines 142 to control fluid flow to the plurality of outlet lines 168 provided by the flow ratio controller 140. In some embodiments, the plurality of bypass valves 180 are disposed in or coupled to the FGE manifold 106. In some embodiments, the plurality of bypass valves 180 are similar to or the same type of valve as the plurality of outlet valves 172.

In use, a flow path for the plurality of process gases from the plurality of gas sources 128 generally extends from the plurality of inlets 110, through the plurality of hybrid valves 150, through the plurality of MFCs 144, through the plurality of mixing lines 170, through the plurality of outlet valves 172, through the plurality of outlets 120, and to respective zones of the plurality of zones 112 of the process chamber 108. The plurality of hybrid valves 150 may be normally open so that the plurality of MFCs 144 determine a flow rate of each of the process gases provided to each delivery zone at a desired interval. In some embodiments, the plurality of hybrid valves 150, or the plurality of ALD valves 154, may be selectively opened or closed to assist with flow direction control when multiple ones of the plurality of gas sources 128 are configured to flow through a same MFC of the plurality of MFCs 144 (for example, see FIG. 3).

The FGE system 100 may include a controller 190 that controls the FGE system 100, using a direct control or indirect control via other computers (or controllers) associated with the process chamber 108, the FGE manifold 106, the gas panel 104, or the flow ratio controller 140. In operation, the controller 190 enables data collection and feedback from the FGE system 100 to control and optimize performance of the FGE system 100. For example, the controller 190 may be configured to receive a process recipe for processing a substrate in the process chamber 108 and configured to independently control the flow of process gases (i.e., from the gas panel 104) to the process chamber 108 in the desired quantity, composition, duration, and location. The controller 190 generally includes a Central Processing Unit (CPU) 192, a memory 194, and a support circuit 196. The CPU 192 may be any form of a general-purpose computer processor that can be used in an industrial setting. The support circuit 196 is conventionally coupled to the CPU 192 and may comprise a cache, clock circuits, input/output subsystems, power supplies, and the like. Software routines, such as a method as described below may be stored in the memory 194 and, when executed by the CPU 192, transform the CPU 192 into a specific purpose computer (controller 190). The software routines may also be stored and/or executed by a second controller (not shown) that is located remotely from the process chamber 108.

The memory 194 is in the form of computer-readable storage media that contains instructions, when executed by the CPU 192, to facilitate the operation of the FGE system 100. The instructions in the memory 194 are in the form of a program product such as a program that implements the method of the present principles. The program code may conform to any one of a number of different programming languages. In one example, the disclosure may be implemented as a program product stored on a computer-readable storage media for use with a computer system. The program (s) of the program product define functions of the aspects (including the methods described herein). Illustrative computer-readable storage media include, but are not limited to: non-writable storage media (e.g., read-only memory devices within a computer such as CD-ROM disks readable by a CD-ROM drive, flash memory, ROM chips, or any type of solid-state non-volatile semiconductor memory) on which information is permanently stored; and writable storage media (e.g., floppy disks within a diskette drive or hard-disk drive or any type of solid-state random access semiconductor memory) on which alterable information is stored. Such computer-readable storage media, when carrying computer-readable instructions that direct the functions of the methods and use of the FGE system 100 as described herein, are aspects of the present principles.

Figure 2A:
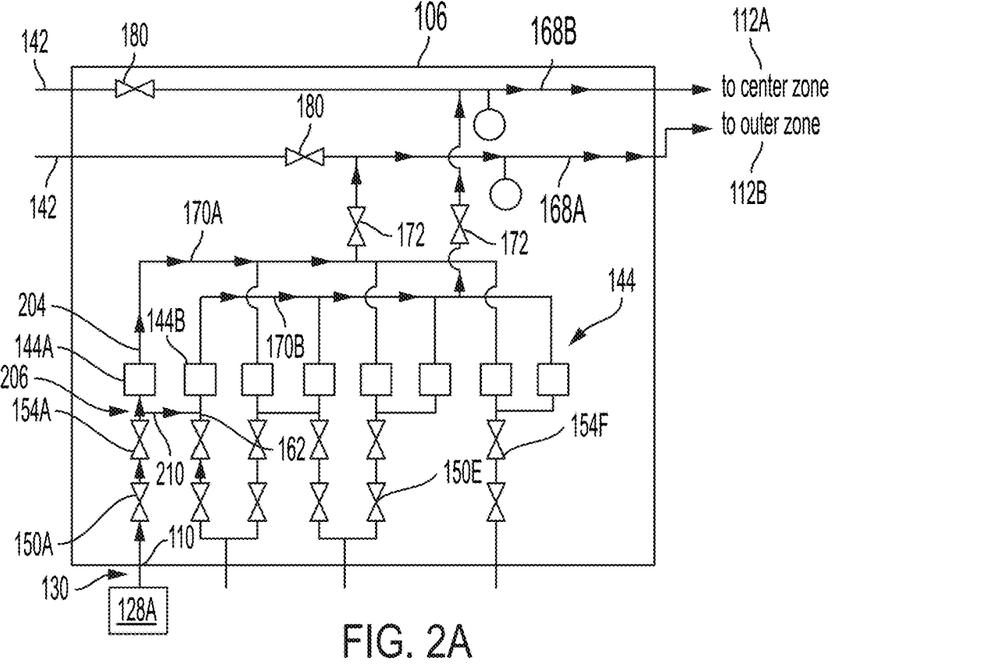
FIG. 2A depicts a schematic view of a fast gas exchange manifold for a process chamber illustrating a flow path for a first process gas in accordance with at least some embodiments of the present disclosure.
Figure 2B:
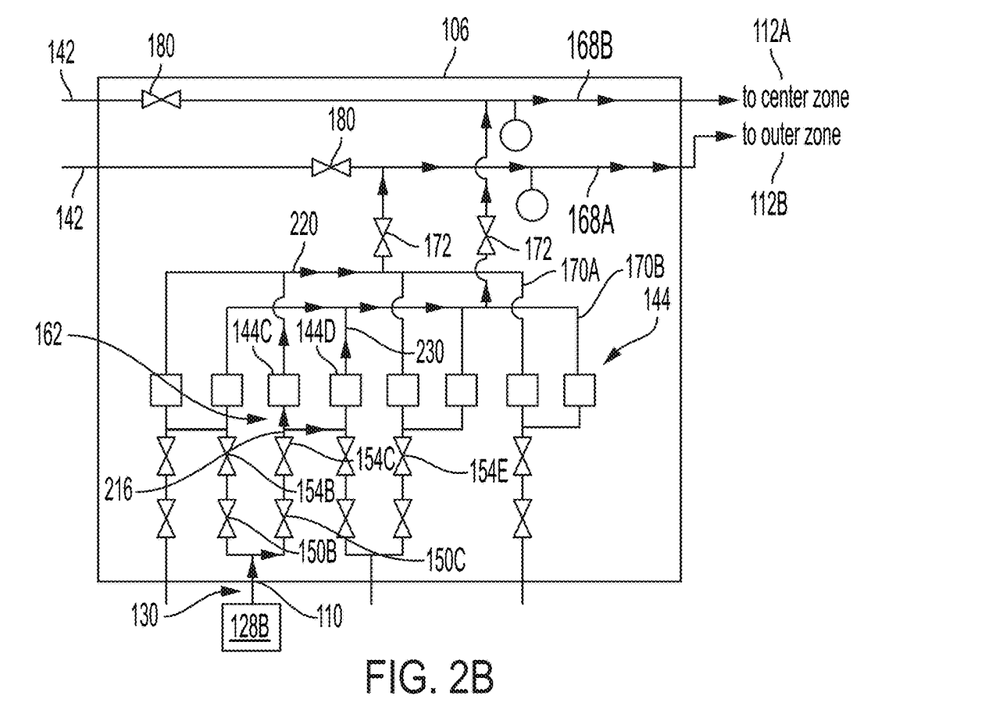
FIG. 2B depicts a schematic view of a fast gas exchange manifold for a process chamber illustrating a flow path for a second process gas in accordance with at least some embodiments of the present disclosure.

FIG. 2A depicts a schematic view of a fast gas exchange manifold 106 for a process chamber illustrating a flow path for a first process gas in accordance with at least some embodiments of the present disclosure. The first process gas can be the gas disposed in the first gas source 128A. FIG. 2B depicts a schematic view of a fast gas exchange manifold for a process chamber illustrating a flow path for a second process gas in accordance with at least some embodiments of the present disclosure. In the embodiments of FIGS. 2A and 2B, each of the plurality of MFCs 144 are dedicated to a single process gas, or in other words, process gases from multiple gas sources 128 do not share any of the MFCs.

The first process gas, as shown in FIG. 2A, is provided to the center zone 112A via a flow path 210 and provided to the outer zone 112B via a flow path 204. The flow path 210 and the flow path 204 may diverge from junction 206 that is disposed between hybrid valve 150A and the MFC 144A. The flow path 204 extends from junction 206 through the MFC 144A, the first mixing lines 170A, and the first outlet line 168A to the outer zone 112B. The flow path 210 extends from junction 206 through the MFC 144B, the second mixing lines 170B, and the second outlet line 168B to the center zone 112A.

The second process gas can be the gas disposed in the second gas source 128B. The second process gas, as shown in FIG. 2B, is provided to the center zone 112A via a flow path 230 and provided to the outer zone 112B via a flow path 220. The flow path 220 and the flow path 230 may diverge from junction 216 that is disposed between hybrid valve 150C and the MFC 144C. The flow path 220 extends from junction 216 through the MFC 144C, the first mixing lines 170A, and the first outlet line 168A to the outer zone 112B. The flow path 230 extends from junction 216 through the MFC 144D, the second mixing lines 170B, and the second outlet line 168B to the center zone 112A. At least one of the ALD valve 154B or the hybrid valve 150B are closed so that all of the second process gas is directed to the MFC 144C and not to the MFC 144B, thus keeping the second process gas and the first process gas separate upstream from the plurality of MFCs 144.

Figure 3:
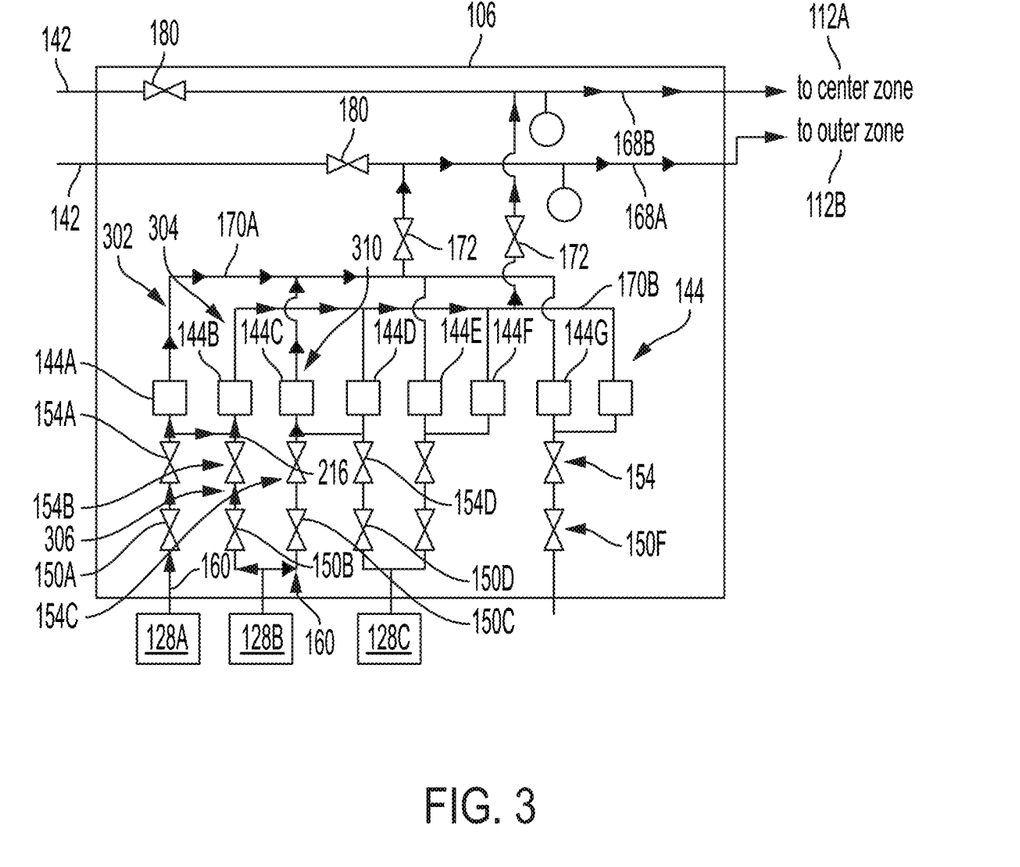
FIG. 3 depicts a schematic view of a fast gas exchange manifold for a process chamber illustrating a flow path for a first process gas and a second process gas in accordance with at least some embodiments of the present disclosure.

FIG. 3 depicts a schematic view of a fast gas exchange manifold for a process chamber illustrating a flow path for a first process gas and a second process gas in accordance with at least some embodiments of the present disclosure. A flow path for multiple of the plurality of gas sources 128 may pass through a same MFC. For example, as shown in FIG. 3, the flow path for the first gas source 128A and the second gas source 128B to the center zone 112A may be shared by passing through the MFC 144B. Similarly, in some embodiments, a flow path for the second gas source 128B and the third gas source 128C to the outer zone 112B may be shared by passing through the MFC 144C of the MFC 144D. By passing multiple process gases through a same MFC, the number of MFCs in the FGE manifold 106 may advantageously be reduced, leading to a smaller footprint, less complexity, and more cost savings.

In the shared arrangement depicted in FIG. 3, a first flow path 302 path extends from the first gas source 128A, through hybrid valve 150A, ALD valve 154A, MFC 144A to the first mixing lines 170A to the outer zone 112B. A second flow path 304 from the first gas source 128A to the center zone 112A extends through hybrid valve 150A, ALD valve 154A, MFC 144B, and the second mixing lines 170B. In some embodiments, ALD valve 154B may be closed when the first process gas is flowing through MFC 144B. A third flow path 306 extends from the second gas source 128B through the hybrid valve 150B, the ALD valve 154B, the MFC 144B to the second mixing lines 170B. In some embodiments, the ALD valve 154A may be closed when the second process gas is flowing through MFC 144B. A fourth flow path 310 extends from the second gas source 128B through hybrid valve 150C, ALD valve 154C, MFC 144C to the first mixing lines 170A. Thus, three MFCs of the plurality of MFCs 144 may be configured for delivering two separate process gases to two zones of the process chamber 108.

Figure 4:
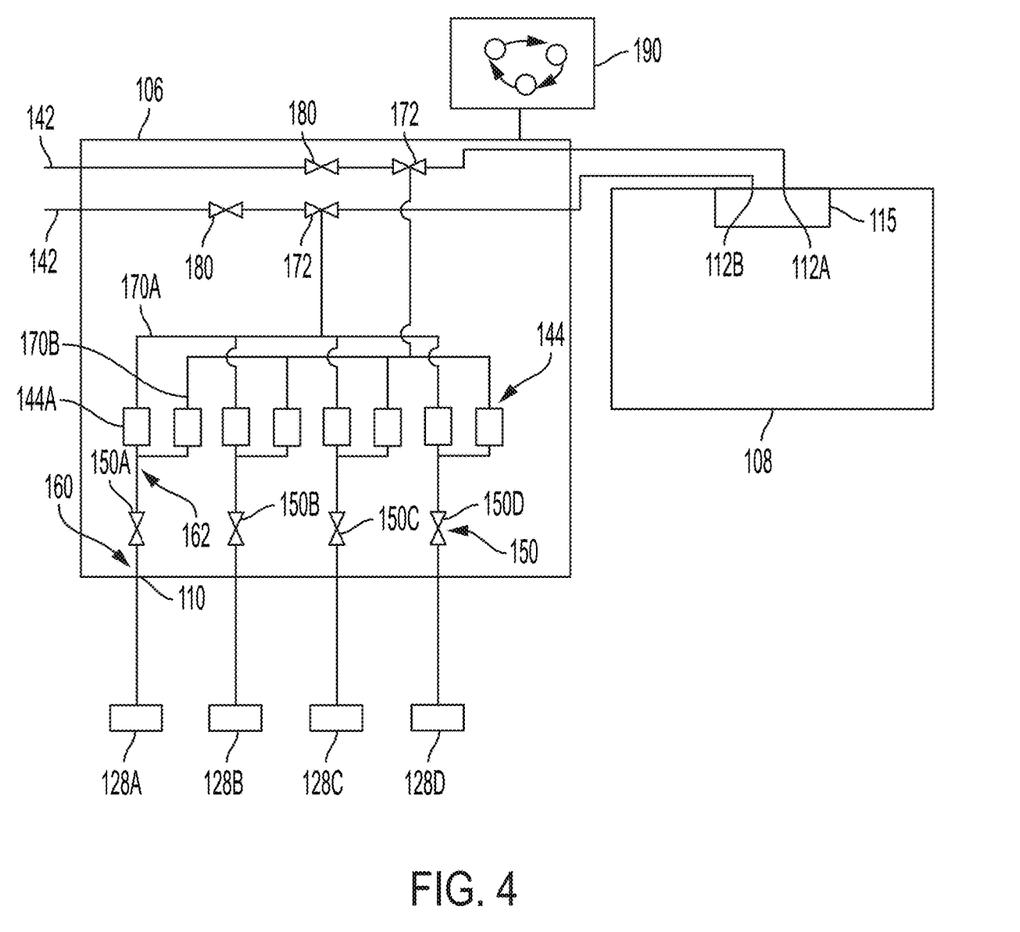
FIG. 4 depicts a schematic view of a substrate processing apparatus in accordance with at least some embodiments of the present disclosure.

FIG. 4 depicts a schematic view of a substrate processing apparatus in accordance with at least some embodiments of the present disclosure. In some embodiments, the FGE manifold 102, as illustrated in FIG. 4, is a relatively compact design and does not include the plurality of ALD valves 154 to provide a relatively simplified design to reduce cost and software complexity. In some embodiments, the plurality of second inlet lines 162 extend from each hybrid valve of the plurality of hybrid valves 150 to two of the plurality of MFCs 144. In such an arrangement, each of the plurality of MFCs 144 is dedicated to a single process gas (i.e., MFCs not shared between multiple process gases).

Figure 5:
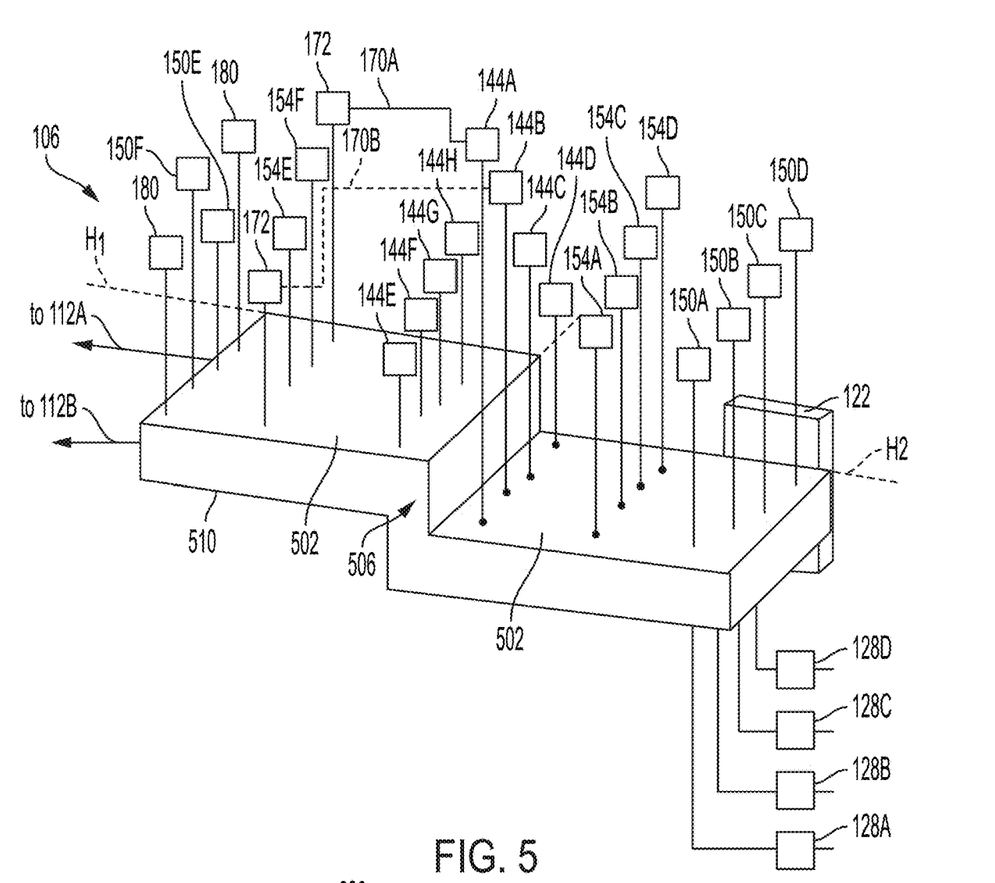
FIG. 5 depicts an isometric schematic view of a fast gas exchange manifold in accordance with at least some embodiments of the present disclosure.

FIG. 5 depicts an isometric schematic view of a fast gas exchange manifold 106 in accordance with at least some embodiments of the present disclosure. In some embodiments, the manifold housing 125 comprises a base plate 510. In some embodiments, the plurality of MFCs 144 are coupled to an upper surface 502 of the base plate 510. In some embodiments, the plurality of hybrid valves 150 are coupled to the upper surface 502. In some embodiments, the ALD valves 154 are coupled to the upper surface 502. In some embodiments, the bypass valves 180 are coupled to the upper surface 502. In some embodiments, the plurality of outlet valves are coupled to the upper surface 502. The plurality of MFCs 144, the plurality of hybrid valves 150, and the plurality of ALD valves 154 may be arranged and coupled to the base plate 510 in any suitable manner.

In some embodiments, the base plate 510 includes a step 506 such that valves and controllers coupled to the upper surface 502 are arranged along two separate horizontal planes H1 and H2. In some embodiments, fluid lines of the FGE manifold 106, such as the mixing lines 170, the plurality of first inlet lines 160, the plurality of second inlet lines 162, and the plurality of outlet lines 168 comprise conduits that couple respective valves and MFCs. In some embodiments, the base plate 510 may be coupled to the chamber body 122 of the process chamber 108.

Figure 6:
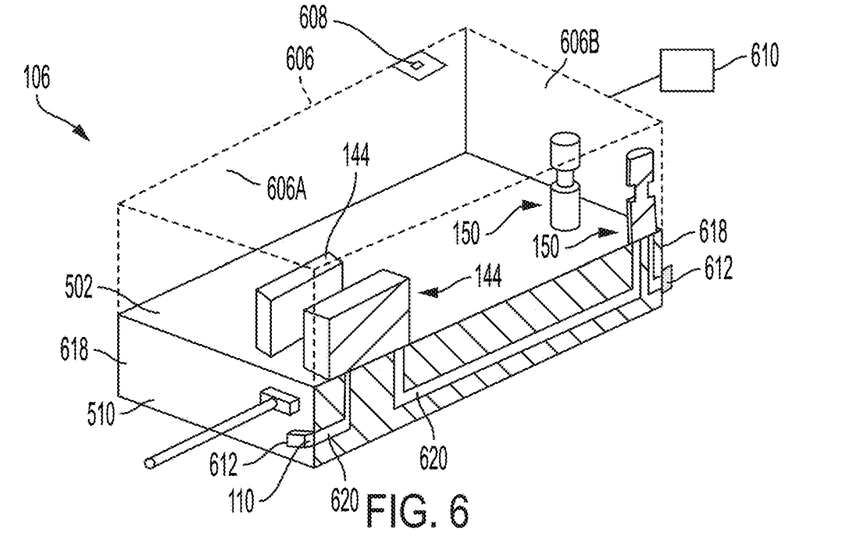
FIG. 6 depicts a simplified isometric schematic view of a fast gas exchange manifold in accordance with at least some embodiments of the present disclosure.

In some embodiments, as shown in FIG. 6, the fluid lines of the FGE manifold 106 may be formed within the base plate 510 of the manifold housing 125. FIG. 6 depicts a simplified isometric schematic view of a fast gas exchange manifold in accordance with at least some embodiments of the present disclosure. Many of the valves and MFCs are omitted from FIG. 6 for ease of view. In some embodiments, the manifold housing 125 includes channels 620 formed within the manifold housing 125 that fluidly couple, for example, the plurality of inlets 110 to the plurality of MFCs 144. The channels 620 formed within the manifold housing 125 may fluidly couple the plurality of MFCs 144 to the plurality of hybrid valves 150 and the plurality of ALD valves. The channels 620 may be formed by drilling the base plate 510, or by other suitable machining methods.

In some embodiments, cover plates 612 are coupled to outer surfaces 618 of the manifold housing 125 at drill locations to define the channels 620 and seal the channels 620. The channels 620 may extend at various angles, orthogonal to, or not orthogonal to, the outer surfaces 618 of the base plate 510, as needed, in order to prevent interference between the channels 620. The design of the manifold housing 125 is advantageously simplified by the use of the channels 620 and cover plates 612 in place of high-cost conduits coupled via manufacturing process like E-beam welding to weld conduits.

In some embodiments, the upper surface 502 of the base plate 510 is substantially flat with no step. In some embodiments, all of the plurality of MFCs 144 are arranged on the manifold housing 125 along a common horizontal plane. The manifold housing 125 may include a removable cover 606 coupled to the base plate 510 to enclose the manifold housing 125 and for ease of service. In some embodiments, the removable cover 606 may include an opening for coupling to an exhaust 610. In some embodiments, the removable cover 606 may comprise a fixed portion 606A and a removable portion 606B, or in the other words, the removable cover 606 may be partially removable. In some embodiments, the removable cover 606 may include an interlock switch 608 configured to indicate if the removable cover 606 is accidentally removed or not placed correctly. In some embodiments, if the interlock switch 608 indicates that the removable cover 606 is incorrectly placed, the FGE system 100 may be shut off or paused.

While the Figures discussed herein generally depict a fast gas exchange manifold for delivering four process gases to a process chamber, the embodiments of the present disclosure are not limited to such an arrangement. For example, the fast gas exchange may be connected to at minimum two process gases and at maximum as much as a process requires. To add additional process gases, extra gas supply lines 130 may extend to additional inlets 110, and additional associated valves disclosed herein such as MFCs 144, hybrid valves 150, or ALD valves 154 are coupled to the respective inlets 110. The respective valves for each additional process gas deliver each additional process gas to a respective outlet line 168.

In some embodiments, the fast gas exchange manifold provided herein may be combined with gas dumping. For example, one or more of the plurality of gas sources 128 may be coupled through the fast gas exchange manifold to a foreline and configured for dumping when an associated valve such as a hybrid valve 150 or an ALD valve 154 is closed and configured for flowing to the process chamber 108, when the associated valve is open.

While the foregoing is directed to embodiments of the present disclosure, other and further embodiments of the disclosure may be devised without departing from the basic scope thereof.

The invention claimed is:

1. A fast gas exchange manifold for a process chamber, comprising:
  a manifold housing having a plurality of inlets and a plurality of outlets for flowing a plurality of process gases therethrough, wherein the plurality of outlets correspond with a plurality of zones in the process chamber;
  a plurality of first valves disposed in the manifold housing and fluidly coupled to the plurality of inlets;
  a plurality of mass flow controllers disposed in the manifold housing downstream of the plurality of first valves, wherein each of the plurality of first valves is associated with one or two of the mass flow controllers, and wherein each mass flow controller is associated with one of the plurality of zones, and wherein a first inlet of the plurality of inlets is fluidly coupled to a first mass flow controller and a second mass flow controller of the plurality of mass flow controllers to selectively flow a first one of the plurality of process gases to either the first mass flow controller or the second mass flow controller;
  a plurality of mixing lines extending downstream from the plurality of mass flow controllers to a plurality of outlet lines corresponding with the plurality of outlets, wherein the plurality of mixing lines associated with each of the plurality of zones are fluidly coupled to a corresponding one of the plurality of outlets; and
  a plurality of outlet valves disposed in line with corresponding ones of the plurality of outlet lines, wherein a flow path is defined between each inlet of the plurality of inlets and each outlet of the plurality of outlets, and wherein each flow path includes one or more of the plurality of first valves and one or more of the plurality of mass flow controllers.

2. The fast gas exchange manifold of claim 1, further comprising:
  a plurality of ALD valves disposed in the manifold housing, wherein a respective one of the plurality of ALD valves is disposed between a respective one of the plurality of first valves and a respective one of the plurality of mass flow controllers.

3. The fast gas exchange manifold of claim 1, wherein each of the plurality of mass flow controllers is configured to flow a single one of the plurality of process gases.

4. The fast gas exchange manifold of claim 1, wherein at least some of the plurality of mass flow controllers are configured to flow multiples ones of the plurality of process gases.

5. The fast gas exchange manifold of claim 1, wherein the plurality of mass flow controllers have a response rate of about 0.1 to about 1 seconds.

6. The fast gas exchange manifold of claim 1, wherein the plurality of zones consist of two zones and the plurality of mass flow controllers consist of eight mass flow controllers.

7. The fast gas exchange manifold of claim 1, wherein the plurality of first valves are pneumatic or manual on/off valves.

8. The fast gas exchange manifold of claim 1, wherein the manifold housing includes a removable cover coupled to a base plate to enclose the manifold housing.

9. The fast gas exchange manifold of claim 8, wherein at least a portion of the plurality of mixing lines extend through channels formed within the base plate.

10. A fast gas exchange system for a process chamber, comprising:
  a fast gas exchange manifold, comprising:
    a manifold housing having a plurality of inlets and a plurality of outlets for flowing a plurality of process gases therethrough;
    a plurality of mass flow controllers coupled to the manifold housing and configured to flow corresponding ones of the plurality of process gases to a plurality of zones of the process chamber, wherein the mass flow controllers are disposed between the plurality of inlets and the plurality of outlets;
    a plurality of first valves coupled to the manifold housing, wherein each of the plurality of first valves is coupled upstream to corresponding ones of the plurality of mass flow controllers via a plurality of inlet lines, wherein at least some of the plurality of inlet lines extend directly from one of the plurality of first valves to two of the plurality of mass flow controllers; and a plurality of mixing lines extending downstream from the plurality of mass flow controllers to a plurality of outlet lines corresponding with the plurality of outlets;

a gas panel having a plurality of gas sources for supplying the plurality of process gases; and gas supply lines extending from the plurality of gas sources to the fast gas exchange manifold, wherein each of the gas supply lines include a control valve.

11. The fast gas exchange system of claim 10, wherein the plurality of inlet lines are fluidly independent from each other upstream from the plurality of mass flow controllers.

12. The fast gas exchange system of claim 10, wherein all of the plurality of mass flow controllers are arranged on the manifold housing along a common horizontal plane.

13. The fast gas exchange system of claim 10, wherein at least a portion of the plurality of mixing lines extend through channels formed within a base plate of the manifold housing, wherein the channels fluidly couple the plurality of mass flow controllers to the plurality of first valves.

14. The fast gas exchange system of claim 13, further comprising cover plates coupled to outer surfaces of the base plate at locations to define the channels.

15. A substrate processing apparatus, comprising:
a process chamber having an interior volume disposed therein, wherein the process chamber includes a plurality of zones; and
a fast gas exchange manifold, comprising:
a manifold housing having a plurality of inlets and a plurality of outlets for flowing a plurality of process gases therethrough, wherein the plurality of outlets correspond with the plurality of zones;
a plurality of first valves disposed in the manifold housing and fluidly coupled to the plurality of inlets;
a plurality of mass flow controllers disposed in the manifold housing downstream of the plurality of first valves and coupled to the plurality of first valves with respective ones of a plurality of inlet lines, wherein the plurality of inlet lines are fluidly independent from each other upstream of the plurality of mass flow controllers, wherein each of the plurality of first valves is associated with one or two of the mass flow controllers, and wherein each mass flow controller is associated with one of the plurality of zones;

a plurality of mixing lines extending downstream from the plurality of mass flow controllers to a plurality of outlet lines corresponding with the plurality of outlets, wherein the plurality of mixing lines associated with each of the plurality of zones are fluidly coupled to a corresponding one of the plurality of outlets; and a plurality of outlet valves disposed in line with corresponding ones of the plurality of outlet lines, wherein a flow path is defined between each inlet of the plurality of inlets and each outlet of the plurality of outlets, and wherein each flow path includes one or more of the plurality of first valves and one or more of the plurality of mass flow controllers.

16. The substrate processing apparatus of claim 15, wherein the manifold housing comprises a base plate having a step so that the plurality of mass flow controllers and the plurality of first valves are arranged along two separate horizontal planes.

17. The substrate processing apparatus of claim 15, further comprising:
a plurality of ALD valves, wherein a respective one of the plurality of ALD valves is disposed between a respective one of the plurality of first valves and a respective one of the plurality of mass flow controllers.

18. The substrate processing apparatus of claim 15, wherein each of the plurality of outlet lines include a pressure sensor.

19. The substrate processing apparatus of claim 15, wherein the plurality of first valves are fluidly coupled to the plurality of inlets via a plurality of first inlet lines.

20. The substrate processing apparatus of claim 19, wherein each of the plurality of first valves are fluidly coupled to two of the plurality of mass flow controllers via a plurality of second inlet lines.

* * * * *